United States Patent
Majumdar et al.

(10) Patent No.: US 7,105,358 B2
(45) Date of Patent: Sep. 12, 2006

(54) APPARATUS AND METHOD FOR VISUALLY IDENTIFYING MICRO-FORCES WITH A PALETTE OF CANTILEVER ARRAY BLOCKS

(75) Inventors: Arunaya Majumdar, Orinda, CA (US); Thomas Michael Perazzo, Simi Valley, CA (US); Minyao Mao, Albany, CA (US); Ohmyoung Kwon, Berkeley, CA (US); Yang Zhao, Berkeley, CA (US); Guanghua Wu, Albany, CA (US)

(73) Assignee: The Regents of the University of California, Berkeley, CA (US)

( * ) Notice: Subject to any disclaimer, the term of this patent is extended or adjusted under 35 U.S.C. 154(b) by 198 days.

(21) Appl. No.: 10/076,838

(22) Filed: Feb. 13, 2002

(65) Prior Publication Data

US 2002/0102743 A1 Aug. 1, 2002

Related U.S. Application Data

(63) Continuation of application No. 09/377,146, filed on Aug. 19, 1999, now abandoned.

(51) Int. Cl.
*G01N 33/543* (2006.01)
(52) U.S. Cl. .................. 436/518; 436/526; 436/805; 436/806; 435/5; 435/6; 435/7.1; 422/82.01; 422/82.05; 422/55; 73/104; 73/105; 73/113; 356/501; 356/502
(58) Field of Classification Search ............... 435/5, 435/6, 7.7; 436/518, 526, 805, 806; 422/20, 422/69, 63, 236, 82.05, 82.01, 55; 73/104, 73/105, 113; 356/501, 502
See application file for complete search history.

(56) References Cited

U.S. PATENT DOCUMENTS

| | | | |
|---|---|---|---|
| 4,236,893 A | 12/1980 | Rice | |
| 4,242,096 A | 12/1980 | Oliveira et al. | |
| 4,487,839 A | 12/1984 | Kamentsky | |
| 4,537,861 A | 8/1985 | Elings et al. | |
| 4,596,697 A | 6/1986 | Ballato | |
| 4,637,987 A | 1/1987 | Minten et al. | |
| 4,651,074 A | 3/1987 | Wuse | |
| 4,735,906 A | 4/1988 | Bastiaans et al. | |
| 4,847,193 A | 7/1989 | Richards et al. | |
| 4,867,946 A | 9/1989 | Gross et al. | |

(Continued)

FOREIGN PATENT DOCUMENTS

WO  WO 95/02180  1/1995

OTHER PUBLICATIONS

Webster's II New Riverside University Dictionary Houghton Mifflin Company 1994.*

(Continued)

*Primary Examiner*—Long V. Le
*Assistant Examiner*—Jacob Cheu
(74) *Attorney, Agent, or Firm*—Gordon & Rees LLP

(57) ABSTRACT

An apparatus to measure micro-forces includes a cantilever palette with a set of cantilever array blocks. Each cantilever array block includes a set of cantilevers, with each cantilever including a set of cantilever fingers surrounded by a frame with frame fingers. The cantilever fingers and the frame fingers form a diffraction grating. Each cantilever array block is configured to be responsive to a predetermined micro-force, such that cantilevers of the cantilever array block deflect in the presence of the predetermined micro-force, which causes the diffraction grating to diffract light and thereby provide a visual indication of the presence of the predetermined micro-force.

26 Claims, 8 Drawing Sheets

U.S. PATENT DOCUMENTS

| | | | |
|---|---|---|---|
| 4,906,840 A | 3/1990 | Zdeblick et al. | |
| 4,909,990 A | 3/1990 | Block et al. | |
| 4,931,384 A | 6/1990 | Layton et al. | |
| 4,999,284 A | 3/1991 | Ward et al. | |
| 5,001,053 A | 3/1991 | Takahashi et al. | |
| RE33,581 E | 4/1991 | Nicoli et al. | |
| 5,025,658 A | 6/1991 | Elings et al. | |
| 5,055,265 A | 10/1991 | Finlan | |
| 5,118,608 A | 6/1992 | Layton et al. | |
| 5,130,257 A | 7/1992 | Baer et al. | |
| 5,135,852 A | 8/1992 | Ebersole et al. | |
| 5,144,833 A | 9/1992 | Amer et al. | |
| 5,156,810 A | 10/1992 | Ribi | |
| 5,156,972 A | 10/1992 | Issachar | |
| 5,172,472 A | 12/1992 | Lindner et al. | |
| 5,179,028 A | 1/1993 | Vali et al. | |
| 5,283,037 A | 2/1994 | Baer et al. | |
| 5,306,644 A | 4/1994 | Myerholtz et al. | |
| 5,323,636 A | 6/1994 | McGowan et al. | |
| 5,350,697 A | 9/1994 | Swope et al. | |
| 5,352,582 A | 10/1994 | Lichtenwalter et al. | |
| 5,372,930 A | 12/1994 | Colton et al. | |
| 5,374,563 A | 12/1994 | Maule | |
| 5,411,709 A | 5/1995 | Furuki et al. | |
| 5,427,915 A | 6/1995 | Ribi et al. | |
| 5,439,829 A | 8/1995 | Anderson et al. | |
| 5,445,008 A | 8/1995 | Wachter et al. | |
| 5,445,970 A | 8/1995 | Rohr | |
| 5,445,971 A | 8/1995 | Rohr | |
| 5,468,606 A | 11/1995 | Bogart et al. | |
| 5,477,716 A | 12/1995 | Snow | |
| 5,482,678 A | 1/1996 | Sittler | |
| 5,494,639 A | 2/1996 | Grzegorzewski | |
| 5,494,829 A | 2/1996 | Sandstrom et al. | |
| 5,501,986 A | 3/1996 | Ward et al. | |
| 5,510,481 A | 4/1996 | Bednarski et al. | |
| 5,525,466 A | 6/1996 | Slovacek et al. | |
| 5,563,341 A | 10/1996 | Fenner et al. | |
| 5,595,908 A | 1/1997 | Fawcett et al. | |
| 5,631,171 A | 5/1997 | Sandstrom et al. | |
| 5,639,671 A | 6/1997 | Bogart et al. | |
| RE35,544 E | 7/1997 | Snow | |
| 5,650,123 A | 7/1997 | Saini et al. | |
| 5,658,732 A | 8/1997 | Ebersole et al. | |
| 5,705,399 A | 1/1998 | Larue | |
| 5,719,324 A | 2/1998 | Thundat et al. | |
| 5,728,584 A | 3/1998 | Sausa et al. | |
| 5,750,410 A | 5/1998 | Dou et al. | |
| 5,753,518 A | 5/1998 | Karlsson | |
| 5,763,191 A | 6/1998 | Knoll et al. | |
| 5,763,768 A | 6/1998 | Henderson et al. | |
| 5,770,389 A | 6/1998 | Ching et al. | |
| 5,770,459 A | 6/1998 | Massey et al. | |
| 5,786,621 A | 7/1998 | Saif et al. | |
| 5,807,758 A * | 9/1998 | Lee et al. | 436/526 |
| 5,819,749 A | 10/1998 | Lee et al. | |
| 5,827,748 A | 10/1998 | Golden | |
| 5,830,134 A | 11/1998 | Caputo et al. | |
| 5,846,708 A | 12/1998 | Hollis et al. | |
| 5,856,203 A | 1/1999 | Robinson et al. | |
| 5,862,003 A | 1/1999 | Saif et al. | |
| 5,888,825 A | 3/1999 | Carr et al. | |
| 5,908,981 A | 6/1999 | Atalar et al. | 73/105 |
| 5,918,263 A | 6/1999 | Thundat | |
| 5,919,576 A | 7/1999 | Hui et al. | |
| 5,923,421 A | 7/1999 | Rajic et al. | |
| 5,923,637 A | 7/1999 | Shimada et al. | |
| 5,955,377 A | 9/1999 | Maul et al. | |
| 5,955,659 A | 9/1999 | Gupta et al. | |
| 5,959,808 A | 9/1999 | Fan et al. | |
| 5,989,923 A | 11/1999 | Lowe et al. | |
| 5,995,334 A | 11/1999 | Fan et al. | |
| 5,998,906 A | 12/1999 | Jerman et al. | |
| 6,000,280 A | 12/1999 | Miller et al. | |
| 6,005,400 A | 12/1999 | Thundat et al. | |
| 6,008,057 A | 12/1999 | Glass et al. | |
| 6,016,686 A | 1/2000 | Thundat | |
| 6,022,748 A | 2/2000 | Charych et al. | |
| 6,029,500 A | 2/2000 | Tom | |
| 6,050,722 A | 4/2000 | Thundat et al. | |
| 6,060,256 A | 5/2000 | Everhart et al. | |
| 6,073,484 A | 6/2000 | Miller et al. | |
| 6,086,821 A | 7/2000 | Lee et al. | |
| 6,096,559 A | 8/2000 | Thundat et al. | |
| 6,096,599 A * | 8/2000 | Kepler et al. | 438/249 |
| 6,103,492 A | 8/2000 | Yu | |
| 6,118,124 A | 9/2000 | Thundat et al. | |
| 6,167,748 B1 | 1/2001 | Britton, Jr. et al. | |
| 6,203,983 B1 * | 3/2001 | Quate et al. | 435/6 |
| 6,212,939 B1 | 4/2001 | Thundat | |
| 6,229,609 B1 | 5/2001 | Muramatsu et al. | |
| 6,249,001 B1 | 6/2001 | Sauer et al. | |
| 6,263,736 B1 | 7/2001 | Thundat et al. | |
| 6,289,717 B1 | 9/2001 | Thundat et al. | |
| 6,436,647 B1 | 8/2002 | Quate et al. | |
| 2002/0092340 A1 | 7/2002 | Prater et al. | |
| 2003/0092016 A1 | 5/2003 | Wiggins et al. | |
| 2004/0007051 A1 * | 1/2004 | Bashir et al. | 73/61.62 |

OTHER PUBLICATIONS

Wu et al., "Bioassay of prostate-specific antigen (PSA) using microcantilevers", Research Article, vol. 19, Sep. 2001, pp. 856-860.

Albrecht et al., "Microfabrication of Cantilever Styli for the Atomic Force Microscope," *J. Vac. Sci Technol* 8(4):3386-3396 (Jul./Aug. 1990).

Barnes et al., "Photothermal Spectroscopy with Femtojoule Sensitivity Using a Micromechanical Device," *Nature*, 372:79-81 (1994).

Binh et al., "A Mechanical Nanosensor in the Gigahertz Range:Where Mechanics Meets Electronics," *Surface Science Letters*, 301:L224-L228 (1994).

Britton, Jr. et al., "MEMS Sensors and Wireless Telemetry for Distributed Systems," Presented at the SPIE 5th International Symposium on Smart Materials and Structures, San Diego, CA, Mar. 2, 1998.

Cleveland et al., "A Nondestructive Method for Determining the Spring Constant of Cantilevers for Scanning Force Microscopy," *Rev. Sci. Instrum.*, 64(2):403-405 (1993).

Florin et al., "Adhesion Forces Between Individual Ligand-Receptor Pairs," *Science*, 264:415-417 (1994).

Gimzewski et al., "Observation of a Chemical Reaction Using a Micromechanical Sensor," *Chemical Physical Letters*, 217(5.6):589-594 (1994).

Hoh et al., "Measuring Intermolecular Binding Forces with the Atomic-force Microscope: The Magnetic Jump Method," Fifty-Second Annual Meeting Microscopy Society of America, New Orleans, LA, Jul. 31-Aug. 5, 1994.

Hoh et al., "Quantized Adhesion Detected with the Atomic Force Microscope," *J. Am. Chem. Soc.*, 114:4917-4918 (1992).

Lee et al., "Sensing Discrete Streptavidin-Biotin Interactions with Atomic Force Microscopy," *Langmuir*, 10:354-357 (1994).

Norton, "Infrared Image Sensors," *Optical Engineering*, 30(11):1649-1663 (1991).

Perazzo et al., "Optimization and Performance of High-Resolution Micro-Optomechanical Thermal Sensors," submitted to Sensors & Actuators Jun. 18, 1996.

Serway, "Physics for Scientists and Engineers," 3rd Edition, Saunders, 1990, Figs. 34A and 38A.

Thundat et al., "Detection of Mercury Vapor Using Resonating Microcantilevers," *Appl. Phys. Let.*, 66(13):1695-1697 (1995).

Thundat et al., "Microcantilever Sensors," *Microscale Thermophysical Engineering*, 1:185-199 (1997).

Serway, Raymond A., "Physics for Scientists & Engineers" Third Edition, Sunders Golden Sunburst Series, pp. 988 & 1073, 1982.

Thundatet et al., "Chemical, Physical, and Biological Detection Using Microcantilivers", Microstructure and Microfabricated Systems, pp. 179-187, 1997.

Berger et al. "Surface Stress in the Self-Asssembly of Alkanethiols on Gold", Submitted to Science Feb. 27, 1997.

Manalis, "Two Dimensional Micromechanical Bimorph Arrays for Detection of Thermal Radiation", *American Institute of Physics*, to appear in Applied Physics Letters, Jun. 1997.

Manalis et al., "Interdigital Cantilevers for Atomic Force Microscopy", *American Institute of Physics*, Applied Physics Letter 69 (25), Dec. 16, 1996.

Minne et al., "Automated Parallel High-Speed Atomic Force Microscopy", *American Institute of Physics*, Applied Physics Letter, vol. 72, No. 18, May 4, 1999, pp. 2340-2342.

Lang et al., "Sequential Position Readout from Arrays of Micromechanical Cantilever Sensors", *A,merican Institute of Physics*, 1998.

Wu et al., "Origin of Nanomechanical Cantilever Motion Generated from Biomolecular Interactions" *PNAS*, vol. 98, No. 4, Feb. 13, 2001, pp. 1560-1564.

Hansen et al., "Cantilever-Based Optical Deflection Assay for Discrimination of DNA Single-Nucleotide Mismatches". *Analytical Chemistry*, vol. 73, No. 7, Apr. 1, 2001, pp. 1567-1571.

Shi et al., "Design and Batch Fabrication of Probes for Sub-100 nm Scanning Thermal Microscopy", *Journal of Microelectromechanical Systems*, vol. 11, No. 3, Sep. 2001, pp. 370-378.

Zhao, et al., "Optomechanical Uncooled Infrared Imaging System: Design, Microfabrication, and Performance", *Journal of Microelectromechanical Systems*, vol. 11, No. 2, Apr. 2002.

Wu et al., "Origin of Nanomechanical Cantilever Motion Generated from Biomolecular Interactions", *PNAS*, vol. 98, No. 4, Feb. 13, 2001.

Baselt, et al., "A High-Sensitivity Micromachined Biosensor", *Proceedings of the IEEE*, vol. 85, No. 4, Apr. 1997.

Lai et al., "Photothermal Measurements at Sub-10 picoWatt Resolution Using Uncooled Miro-optomecanical Senors", submitted to Applied Physics Letters, Jun. 19, 1996.

Wu et al., "Bioassay of prostate-specific antigen (PSA) using microcantilevers," Research Article, vol. 19, Sep. 2001, pp. 856-860.

* cited by examiner

APPARATUS AND METHOD FOR VISUALLY IDENTIFYING MICRO-FORCES WITH A PALETTE OF CANTILEVER ARRAY BLOCKS

This is a continuation of application Ser. No. 09/377,146, filed Aug. 19, 1999 now abandoned.

This invention was made with Governmental support under Grant (Contract) No. CTS-9423141 awarded by the National Science Foundation and DARPA N66001-97-C-8621. The Government has certain rights to this invention.

BRIEF DESCRIPTION OF THE INVENTION

This invention relates generally to sensors that are fabricated using semiconductor processing techniques. More particularly, this invention relates to a batch fabricated cantilever palette with individual cantilever array blocks to identify micro-forces.

BACKGROUND OF THE INVENTION

Sensors for measuring strong forces are well known in the art. For example, sensors to identify strong mechanical, acoustic, magnetic, electrostatic, and thermal forces are well known. There is a growing demand for fast, sensitive, inexpensive, and reliable sensors to identify micro-forces. As used herein, the term micro-force refers to a force that is capable of deflecting, but not destroying, a micron scale cantilever. The micro-forces may be in the form of chemical, mechanical, thermal (through conduction, convection or radiation), acoustic, magnetic, or electrostatic forces or combinations of these forces. By way of illustration, the invention is described in connection with the sensing of micro-forces arising from biological interactions, which create micro-forces in the form of chemical-mechanical forces.

In the context of measuring micro-forces associated with biological interactions, one could focus, for example, on the need to detect disease and biological pathogens. As discussed below, conventional methods for biological sensing suffer from at least one of several problems, including long analysis time, high instrumentation cost, lack of sensitivity, and the inability for real-time monitoring.

Immunosensors utilize the specificity of antibody-antigen (Ab-Ag) interactions in combination with a variety of transduction techniques. Electrochemical devices monitor the current at a fixed potential (amperometry) or voltage at zero current (potentiometry), or conductivity or impedance changes due to biochemical reaction. Optical methods use the effect of biological events on light absorption, fluorescence, refractive index variation, or other optical parameters. Techniques such as surface plasmon resonance (SPR) have shown promise in providing direct measurement of Ag-Ab interactions occurring at the surface-solution interface. The major draw back of optical systems is the use of complex optical components and their high cost. Thermometric devices operate by measuring enthalpy changes during the biological reaction. Piezoelectric devices utilize surface acoustic waves to detect changes in resonance in the presence of Ag-Ab reactions. The principal attraction of piezoelectric immunosensors is their ability to directly monitor the binding of Ab-Ag reactions encountered in affinity sensing. The enzyme linked immunosorbent assay (ELISA) is a sensitive technique for diagnosis. Enzyme immunoassays combine the specific recognition of antibodies for their target molecules with the catalytic power of enzymes into a single sensitive and relatively simple test. Antibodies, bacterial and viral antigens, nucleic acids, and many diverse molecules are detected by an indicator system in which the bound enzyme convert a colorless chromogenic substrate into brightly colored products. ELISA, however, involves multiple steps making it labor intensive.

Micron scale cantilever beams are currently used as ultra-sensitive force sensors in many different applications. Cantilevers can be fabricated in arrays using almost any material that is compatible with microfabrication. For example, semiconductor-based cantilevers are used in atomic force microscopes (AFMs). The length, width, thickness, and modulus of a cantilever beam can be controlled to produce spring constants, g, between 0.01–10 N/m and with resonant frequency in the range of 10–500 kHz. Cantilever deflections, d, can be optically detected with resolutions of about 1 Å or 100 pm, which leads to a force resolution, F=gd, in the range of 1–100 pN.

In addition to their wide use in AFMs where the force is applied at a single point (the tip), microcantilevers have recently been used as sensors for measuring extremely small bending moments that are produced by thermally or chemically generated stresses over the whole cantilever surface. It has been demonstrated that a cantilever beam can be used as a calorimeter to detect the heat of a catalytic reaction. Cantilevers have also been used as infrared sensors where the thermal stress is produced by infrared absorption. Each of these systems relies upon complex and expensive optical processing equipment.

Microcantilevers have also been used for detecting enzyme-mediated catalytic biological reactions with femto-Joule resolution, as shown in T. Thundat, et al., "Microcantilever Sensors", *Microscale Thermophysical Engr.* 1, 185–199 (197). Thundat and co-workers disclose an anti-body-Antigen (Ab-Ag) reaction using a cantilever sensor, presumably due to surface stresses generated by intermolecular force interactions of the Ag-Ab complex. Thundat analyzes frequency changes in a single resonating cantilever beam. Thus, the Thundat system requires active circuitry to operate the cantilever beam and to measure cantilever beam frequency responses to biological reactions.

In view of the foregoing, it would be highly desirable to provide an improved technique for sensing micro-forces. In particular, it would be highly desirable to provide a technique with reduced analysis time, low instrumentation cost, high sensitivity, and real-time monitoring.

SUMMARY OF THE INVENTION

The apparatus of the invention is a cantilever palette with a set of cantilever array blocks. Each cantilever array block includes a set of cantilevers, with each cantilever including a set of cantilever fingers surrounded by a frame with frame fingers. The cantilever fingers and the frame fingers form a diffraction grating. Each cantilever array block is configured to be responsive to a predetermined micro-force, such that cantilevers of the cantilever array block deflect in the presence of the predetermined micro-force, which causes the diffraction grating to diffract light and thereby provide a visual indication of the presence of the predetermined micro-force.

The method of the invention includes the step of forming a cantilever palette including a set of cantilever array blocks, each cantilever array block including a set of cantilevers. Each cantilever includes a set of cantilever fingers surrounded by a frame with frame fingers. The cantilever fingers and the frame fingers form a diffraction grating. Each cantilever array block is configured to be responsive to a predetermined micro-force. The cantilever palette is exposed to the predetermined micro-force, thereby causing cantilevers of the cantilever array block to deflect such that the diffraction grating produces diffracted light. The diffracted light from the diffraction grating is visually observed to identify the presence of the predetermined micro-force.

Those skilled in the art will appreciate that the technique of the invention provides sensing with reduced analysis time, low instrumentation costs, high sensitivity, and real-time monitoring. Advantageously, the real-time monitoring may be accomplished through visual observation by a human eye. The visual observation may also be augmented with various optical devices.

In the context of biological sensing, the invention exploits the high specificity of monoclonal Ab-Ag reactions and the sensitivity of microcantilevers for ultra-low force detection. Thus, the invention may be exploited in polynucleotide hybridization and protein-nucleic acid interactions (such as, e.g., DNA/RNA, DNA/DNA, protein-DNA, and protein-RNA). Further examples of the use of the invention in the context of biological sensing include pathogen detection, medical diagonostics, implantable biosensors, food processing/monitoring, environmental monitoring, pharmaceutical screening, and the like. The sensors of the invention are particularly suited for processes that are liquid based, since electrical contact with the liquid is not necessary. Advantageously, the invention provides for visual readout, which is advantageous for field applications. In addition, the invention utilizes the low cost of microfabricating cantilever arrays by standard CMOS or surface micromachining techniques.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Figure 1:
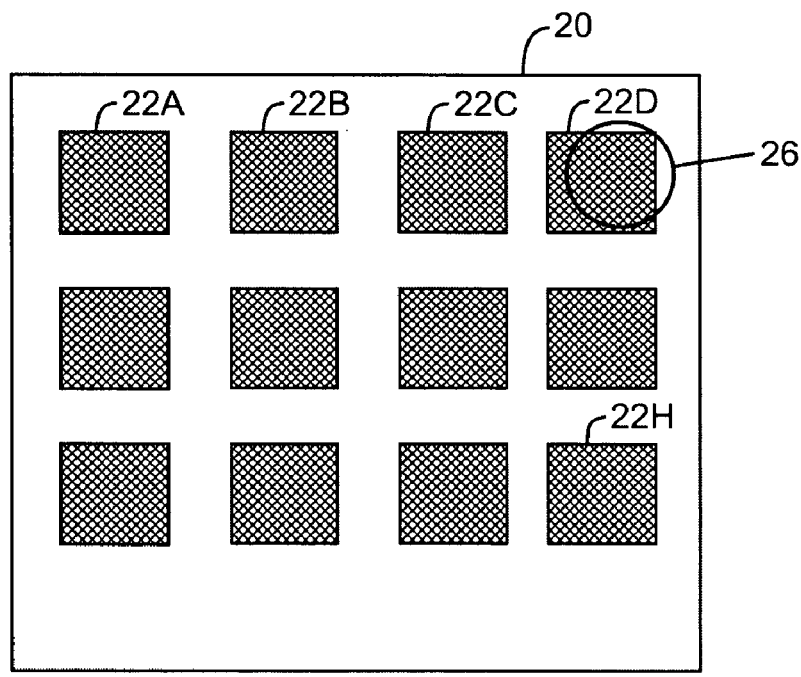
FIG. 1 illustrates a cantilever palette constructed in accordance with an embodiment of the invention.
Figure 2:
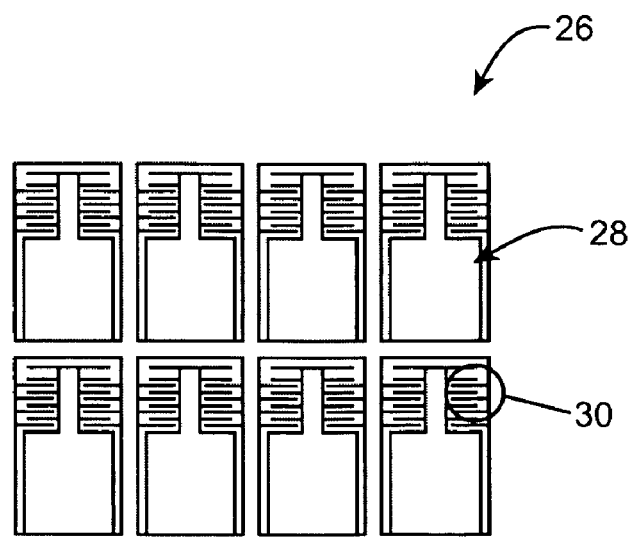
FIG. 2 illustrates individual cantilevers forming a portion of a cantilever block of the cantilever palette of FIG. 1.

FIG. 1 illustrates a cantilever palette 20 constructed in accordance with an embodiment of the invention. The cantilever palette 20 includes a set of cantilever array blocks 22A–22N. Each cantilever array block 22 includes a set of cantilevers, as shown in FIG. 2, which illustrates a sub-set 26 of the cantilevers of cantilever array block 22D of FIG. 1. FIG. 2 illustrates individual cantilevers 28. Each cantilever 28 includes cantilever fingers 30.

By way of example, the cantilever palette 20 contains N cantilever array blocks 22, with each cantilever array block 22 being approximately 5 mm×5 mm in size, thus individual array blocks 22 are visible to the naked eye and are sufficiently large for loading a substance that is to be sensed. In one implementation, each cantilever array block contains an array of approximately 50×50 cantilevers 28, with each cantilever 28 being about 100 µm×100 µm in size. Each cantilever 28 may be implemented with a series of 1–2 µm wide cantilever fingers 30.

Figure 3:
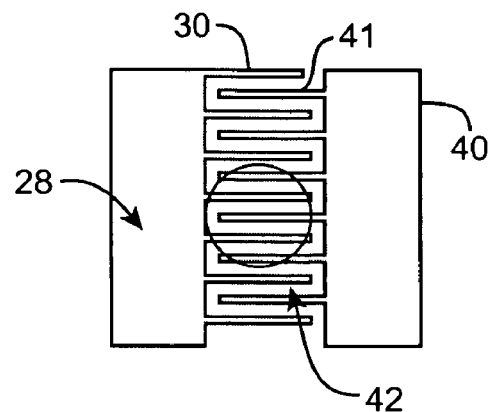
FIG. 3 illustrates a portion of a diffraction grating utilized in accordance with an embodiment of the invention.

FIG. 3 illustrates a portion of a single cantilever 28 with cantilever fingers 30. The cantilever 28 is surrounded by a substrate 40, which includes frame fingers 41. The cantilever fingers 30 and the frame fingers 41 form a diffraction grating 42. As discussed below, in the presence of a predetermined force, the cantilever 28 deflects and the diffraction grating 42 produces observable diffracted light.

Figure 4:
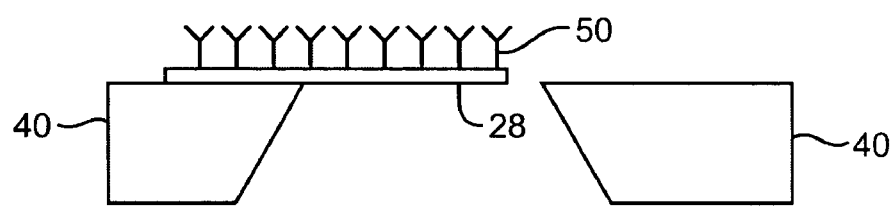
FIG. 4 illustrates a cantilever with a force sensing material utilized in accordance with an embodiment of the invention.

FIG. 4 is a side view of a single cantilever 28. The cantilever 28 includes a force sensing material 50. The force sensing material 50 maybe an externally applied coating or it may be a material incorporated into the cantilever 28. The force sensing material is selected to sense chemical-mechanical, magnetic, electrostatic, thermal (conduction, convection, radiation), or other forces.

Figure 5:
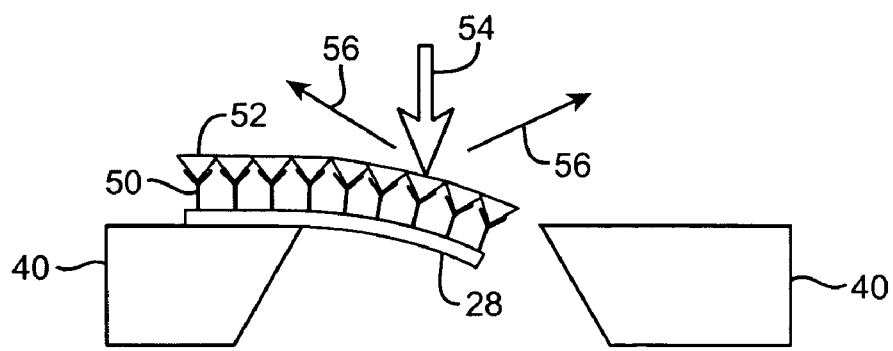
FIG. 5 illustrates the deflection of the cantilever of FIG. 4 in the presence of a micro-force.

FIG. 5 illustrates that in the presence of a predetermined micro-force, in this example illustrated as a substance 52, the interaction between the force sensing material 50 and the substance 52 causes the cantilever 28 to deflect. Incident light 54 is diffracted by the deflected cantilever 28 through the diffraction grating 42 to produce diffracted light 56, which is visually identifiable.

Figure 6:
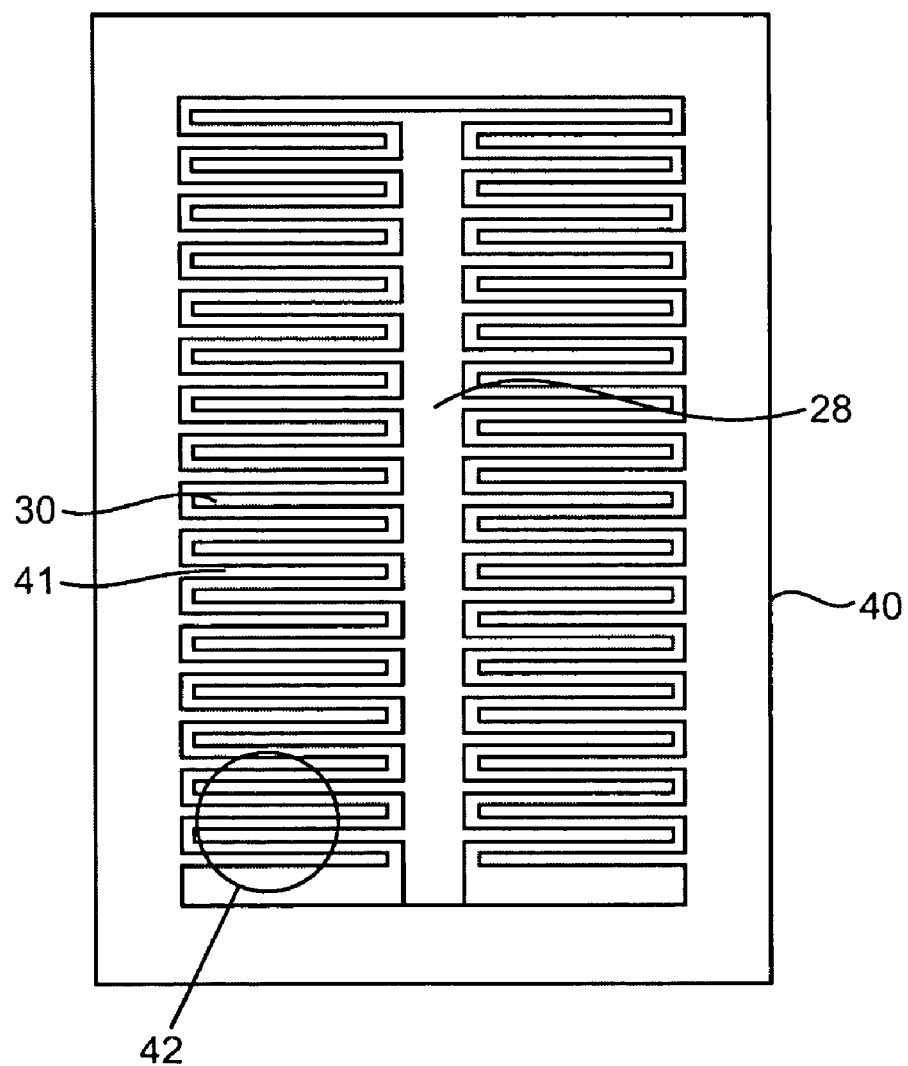
FIG. 6 illustrates a diffraction grating utilized in accordance with an embodiment of the invention.

FIG. 6 is a complete illustration of a single cantilever 28 constructed in accordance with an embodiment of the invention. The cantilever 28 includes cantilever fingers 30 surrounded by a substrate 40, which includes frame fingers 41. The combination of the cantilever fingers 30 and the frame fingers 41 forms a diffraction grating 42.

Returning to FIG. 1, the cantilever palette 20 may be configured in a number of ways. For example, the cantilever palette may be configured such that each cantilever array block 22 is used to sense a different micro-force. The micro-forces that may be sensed in accordance with the invention include chemical-mechanical forces, magnetic forces, electrostatic forces, thermal-mechanical (thermomechanical) forces, and the like. Typically, a cantilever palette 20 is configured to sense a single micro-force, for example a chemical-mechanical force induced by a predetermined substance. As used herein, the term substance refers to any liquid, gaseous, or solid matter.

Each cantilever array block 22 may be configured to be responsive to a different predetermined substance. In this case, N different substances may be sensed with a single cantilever palette 20.

Alternately, each cantilever array block 22 may be configured to be responsive to a predetermined level of a single substance. In such an embodiment, the number of blocks 22 producing visible light specifies the level of the sensed substance.

In another embodiment of the invention, the palette 20 is divided into cantilever array block subsets. For example, a column of cantilever array blocks 22 may be assigned to measure varying levels of a single substance. In this case, the number of cantilever array blocks 22 within a column that produces visible light will indicate the level of the sensed substance.

The foregoing aspects of the invention are more fully appreciated with reference to a specific example. Consider the case where each of the N cantilever array blocks 22 is loaded with a single type of monoclonal antibody (Ab), such that N different types of antibodies are tested on a single palette 20. The antibodies are attached to one side of the cantilevers 28 in order to produce differential surface stress. When the cantilever palette 20 is exposed to a solution of antigens (Ag), the high specificity of the Ab-Ag reaction chemically and mechanically induces deflection of only the particular array of cantilevers that contains the corresponding antibody. The cantilevers deflect with respect to the surrounding stationary frame fingers 41. The cantilever fingers 30 are designed such that the incidence of white light on the array of cantilever-based diffraction grating produces a predetermined color that is visible to the human eye.

Once the cantilever palette 20 is fabricated and loaded with antibodies, the cantilever palette 20 is exposed to antigens and visually observed for color change in the array. The cantilever palette 20 thereby operates as a micro-mechanical "litmus paper" for detection of antigens.

Observe that the cantilever palette 20 does not require external power, since the actuation is chemical and mechanical (chemical-mechanical) and the detection is based on dispersion of background white light. If necessary, a light source, such as a light emitting diode or a laser in conjunction with photodiodes can be used to detect the cantilever deflection. Another advantage of the invention is that a single 3 cm×3 cm chip can detect about (N=) 25–30 antigens making the process highly parallel. The low fabrication and operation costs for the cantilever palette 20 make it disposable. The high specificity of Ag-Ab reactions make the test highly selective. The cantilever palette is several orders of magnitude more sensitive than existing techniques. Advantageously, the cantilever palette is a "passive" device in the sense that the cantilevers are not oscillated, as commonly done with prior art cantilevers used in sensing applications. This visual output is achieved by the diffraction grating produced between the cantilever fingers 30 and the frame fingers 41. That is, the movement of the cantilever 28 causes the cantilever fingers 30 to move with respect to the stationary frame fingers 41, thereby producing an optically observable event. Since the output from the cantilever palette 20 is visually observable, expensive optical processing equipment is not required.

Monoclonal antibodies can be loaded into the cantilever palette 20 in several ways. As known in the art, antibodies are proteins which tend to have higher affinity to glass than metal surfaces, such as gold. Hence, if one surface is coated with gold and the other with silicon dioxide, the antibodies preferentially cover more of the glass surface than the gold. Dipping the cantilever palette 20 into a solution of antibodies is sufficient for coating the glass-side of the cantilever with antibodies.

More sophisticated monoclonal antibody loading methods may also be used. One method involves a mixed alkanethiol monolayer (self-assembled monolayer or SAM) which maintains a hydrophilic interface for the biomolecule, yet passivates the high energy gold surface from nonspecific adsorption. Covalent linkages between the biomolecule and the SAM are achieved via peptide linkages. Alternatively, if the silicon side of the cantilever (or an oxide coated metal surface) is to be derivatized, photodefinable silane mono-layers may be used to couple biomolecules to the surface. It is important to avoid the standard silanes (e.g. trimethoxy derivatives) because they have a tendency to form three dimensional layers on the surface. This results in loss of coupling between the cantilever 28 and the added mass presented by the antibody or antibody/colloidal gold conjugate.

The cantilever 28 may be implemented with silicon nitride, polysilicon, and single crystal silicon. Design parameters include size of the membrane, length and width of the cantilever, length and width of the cantilever fingers, the frame fingers, the number of fingers, and the like.

Figure 7A:
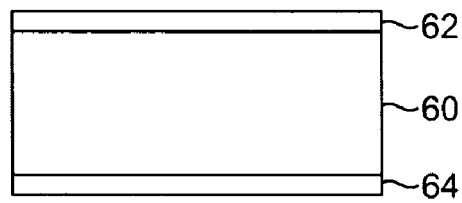
FIGS. 7(a)–7(l) illustrate processing steps utilized to construct an apparatus in accordance with the invention.
Figure 7B:
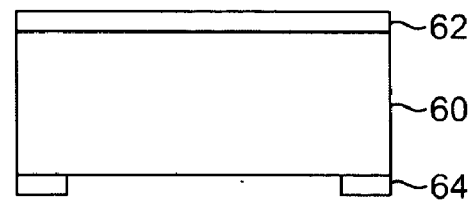

FIGS. 7(a)–7(l) illustrate processing steps that may be used to construct a cantilever palette 20 in accordance with an embodiment of the invention. FIG. 7(a) illustrates a semiconductor wafer 60 with 1 micron phosphosilicate glass (PSG) layers 62. A plasma etch is used to pattern the backside of the wafer 60, resulting in a backside patterned PSG layer 64, as shown in FIG. 7(b).

Figure 7C:
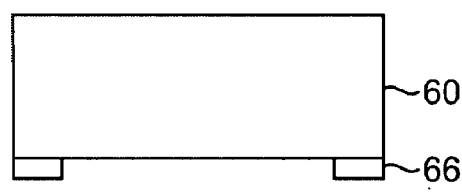

Next, the PSG layer on the top side is removed and the PSG layer on the back side is thinned to 0.5 microns using plasma etching and a PSG wet etch. This results in the device of FIG. 7(c). FIG. 7(c) illustrates the wafer 60 with a backside patterned and thinned PSG layer 66.

Figure 7D:
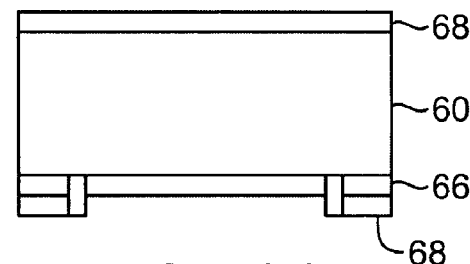
Figure 7E:
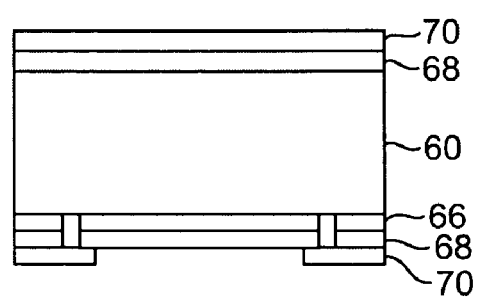

A 0.5 micron PSG layer is then grown on both sides of the wafer 60. This results in the device of FIG. 7(d). FIG. 7(d) illustrates the second PSG layer 68. A 0.5 micron to 1.0 micron Low Pressure Chemical Vapor Deposition (LPCVD) silicon nitride layer is then grown onto the wafer 60, resulting in the structure of FIG. 7(e). FIG. 7(e) illustrates the resultant silicon nitride layers 70.

Figure 7F:
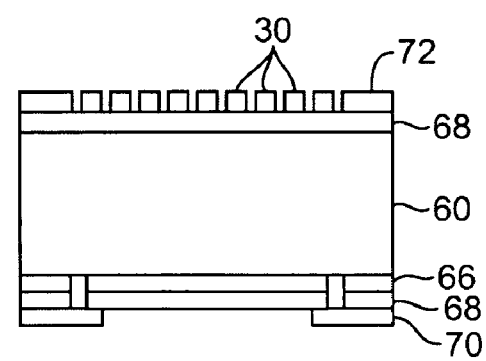

A silicon nitride cantilever is then patterned and etched using a plasma etch. This results in the structure of FIG. 7(f). FIG. 7(f) is a side view of a cantilever, showing cantilever fingers 30 formed in a patterned nitride layer 72. Only one cantilever is shown, but it should be appreciated that a batch process is disclosed, resulting in a large number of cantilevers, cantilever array blocks, and cantilever palettes being fabricated at the same time.

Figure 7G:
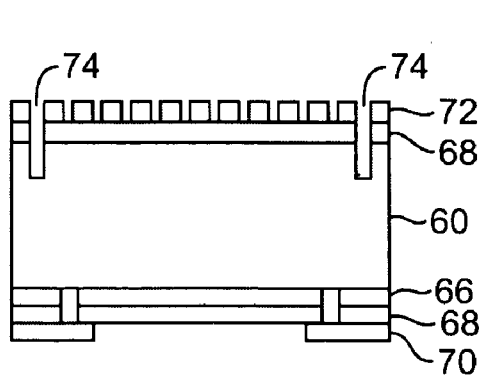
Figure 7H:
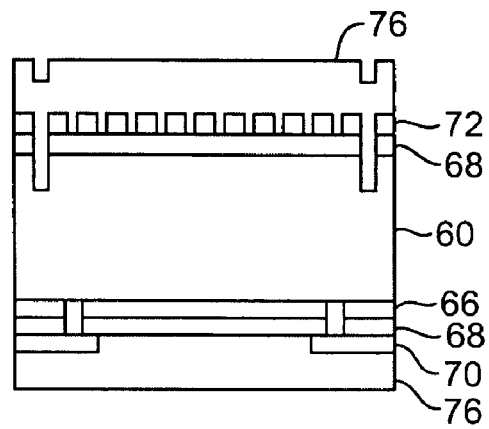
Figure 7I:
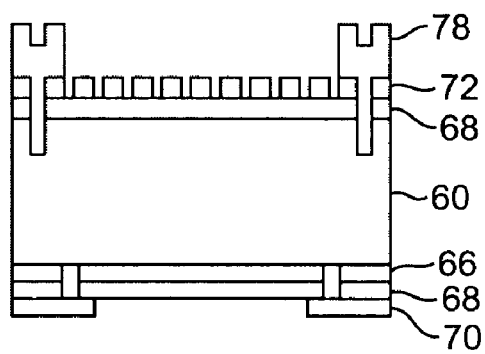

The next processing step relates to patterning deep alignment holes. Deep alignment holes 74 are illustrated in FIG. 7(g). The deep alignment holes 74 are used to construct frames that will provide structural integrity for the cantilevers. As discussed above, the frames also include frame or frame fingers 41 which form a portion of the diffraction grating. The frames are constructed by depositing a thick (e.g., 5–10 micron) polysilicon layer. FIG. 7(h) illustrates a thick polysilicon layer 76. A polysilicon frame is then patterned and etched, resulting in the device of FIG. 7(i). FIG. 7(i) illustrates a PSG frame 78. A top view of the frame 78 would illustrate frame fingers 41 positioned between the cantilever fingers 30.

Figure 7J:
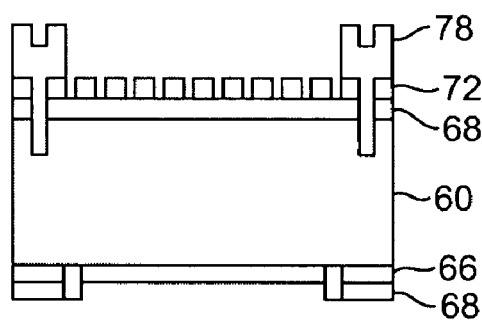
Figure 7K:
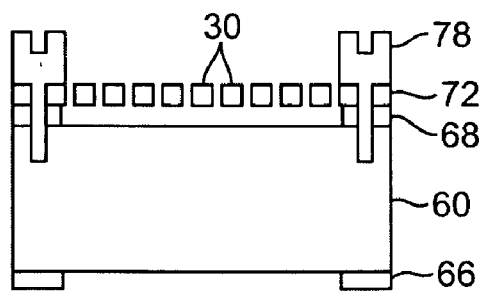

The silicon nitride layer 70 on the backside of the wafer 60 is then plasma etched, resulting in the device of FIG. 7(j). The silicon nitride cantilever is then released using a wet etch. This results in the structure of FIG. 7(k). Observe in FIG. 7(k) that the cantilever and associated cantilever fingers 30 are suspended.

Figure 7L:
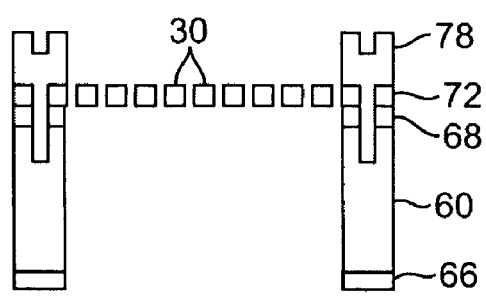

The final processing step is to deep etch the silicon substrate 60. This results in the final device, as shown in FIG. 7(l). The device can now function in the manner set forth above.

The invention has now been fully disclosed. Those skilled in the art will recognize many variations of the invention that are within the general teachings of the invention. Further, those skilled in the art will appreciate that the invention may be exploited in connection with other physical devices. For example, the invention need not be used solely in connection with direct visual read out by a human eye. The images created in accordance with the invention may be applied to an imaging device, such as a charge coupled device and then be analyzed with image processing software. In addition, the invention may be used in connection with various image enhancement devices, such as beam splitters, lenses, and filters.

Figure 8:
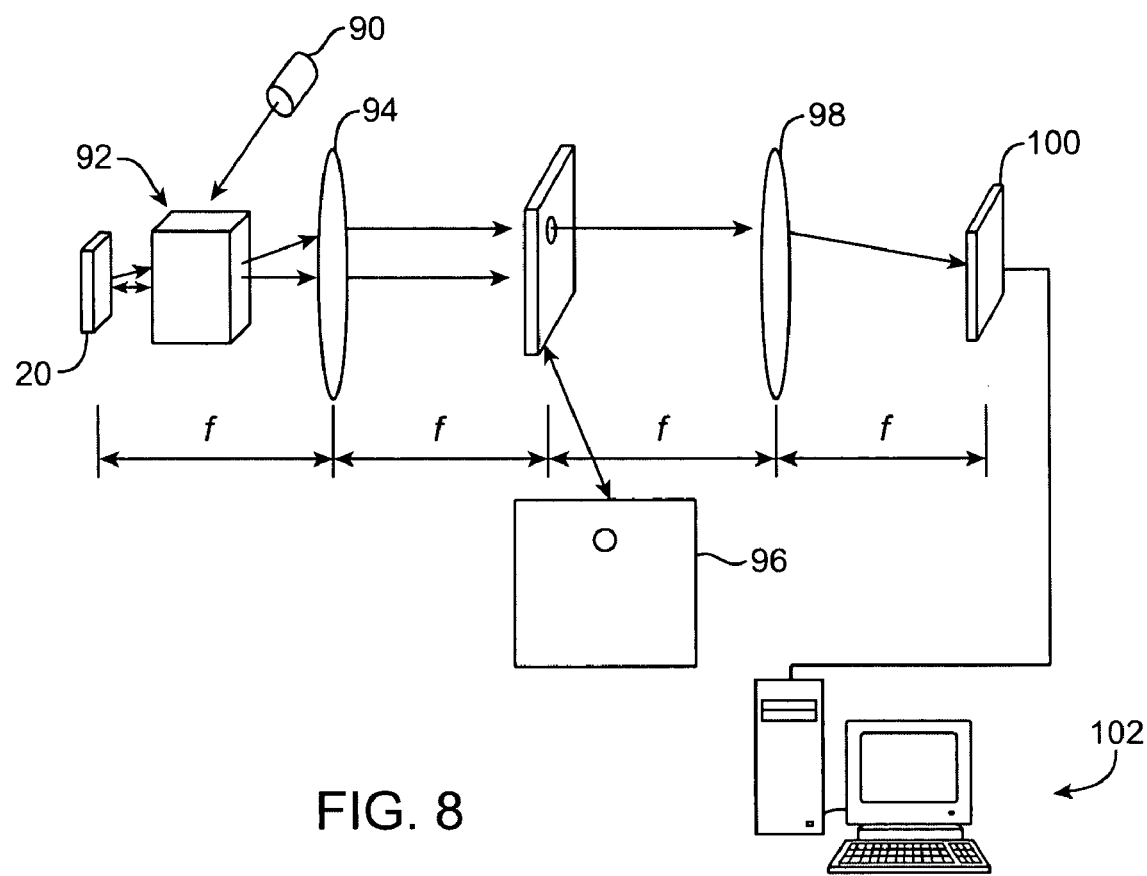
FIG. 8 illustrates image enhancement devices that may be used in accordance with an embodiment of the invention.

FIG. 8 illustrate an image enhancement device in accordance with an embodiment of the invention. The cantilever palette 20 projects an image toward a beam splitter 92, which also receives visible light from a low-power visible light source 90. The output from the beam splitter 92 is applied to a first visible lens 94, a spatial filter 96, a second visible lens 98, and then an imaging device, such as a charge coupled device 100. The output from the imaging device 100 is applied to an image processing system 102, which may include a standard computer executing standard image processing software.

Figure 9:
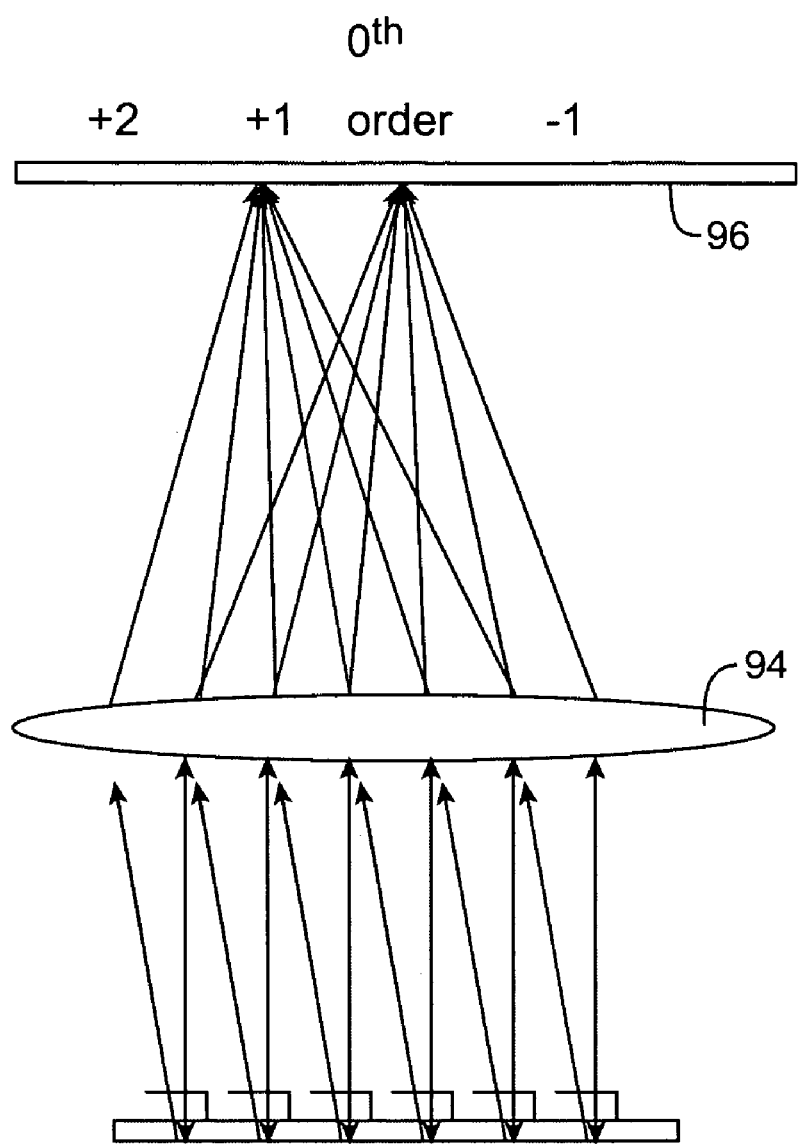
FIG. 9 illustrates a spatial filter with a 3 mm diameter clear aperture which allows first order signals to pass in accordance with an embodiment of the invention.

As indicated above, incident light is diffracted by the diffraction grating. In particular, incident light is diffracted by the diffraction grating at a series of specific angles corresponding to the particular order of the diffraction. The first focusing lens 94 performs a spatial Fourier transform and generates the diffraction pattern on its focal plane. Because of the structure of the whole focal plane array, the diffraction pattern contains two different spatial frequencies: one corresponding to the periodicity of the inter-digital fingers (formed by the cantilever fingers and frame fingers), and the other corresponding to pixel-to-pixel periodicity within the cantilever array. The energy distribution between the diffraction orders depends on the relative distance between the movable and fixed inter-digital fingers. As shown in FIG. 9, the primary peaks in the diffraction pattern are determined by the high frequency part corresponding to the periodicity of the fingers, while low-frequency periodicity of the pixel provides the sub-order secondary peaks within the primary peaks. A spatial filter 96 with a 3 mm diameter clear aperture allows first order signals to pass.

After the first order primary peak containing the sub-order peaks pass through the spatial filter 96, a second lens 98 is used to perform an inverse Fourier transform and restores the wave-front from the spectral information. The aperture size of the spatial filter 96 is large enough to allow most of the sub-orders of the first main order to pass through. Thus, the wavefront still contains the cantilever array information.

Figure 10:
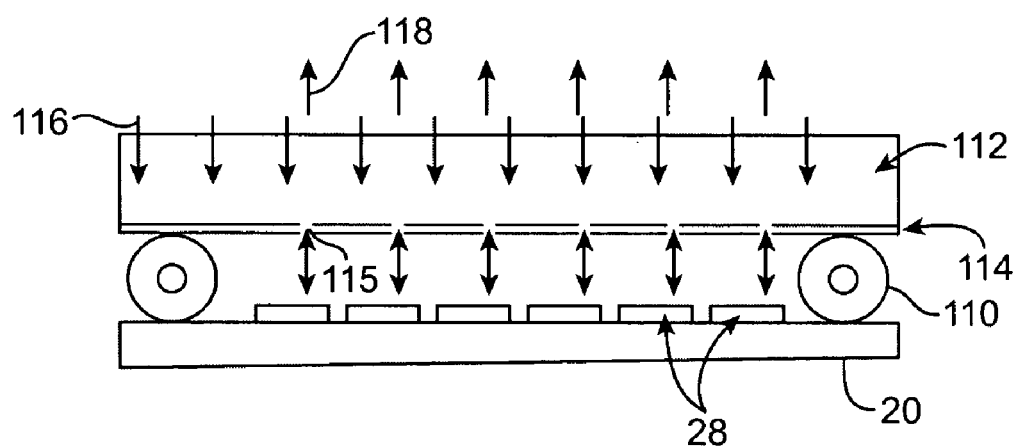
FIG. 10 illustrates a pin hole array utilized in accordance with an embodiment of the invention.

Variations on the structure of FIG. 8 will be recognized by those skilled in the art. For example, a subset of the components of FIG. 8 may be used to project the image directly onto a human eye. In addition, an image enhancement structure may be attached directly to the cantilever palette 20. For example, as shown in FIG. 10, the cantilever palette 20 may be attached to a pin-hole array 112 via a spacer 110. The base of the pin-hole array 112 includes a dark mirror coating 114 with pin holes 115 formed therein. Incident visible light 116 and scattered visible light 118 from the cantilevers 28 pass through the pin holes 115. Each pin hole 115 is placed directly above the diffraction grating of each pixel in the array to reduce cross talk.

The pin hole array may be fabricated by depositing a coating of low reflectivity and transmissivity on a glass substrate and then patterning to leave 30 µm square apertures. By placing the pin hole array 350 µm away from the cantilever palette 20, it was theoretically predicted and experimentally established, that the zeroth order intensity changed from bright to dark for a relative displacement of the grating by $\lambda/4$ ($\lambda=632$ nm was the He—Ne laser wavelength used here). Since the human eye can typically detect about 200 shades of gray scale, this results in a resolution of about 1 nm for measuring cantilever deflections.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

The invention claimed is:

1. An apparatus to measure micro-forces due to interactions between a predetermined substance and a sensing material that binds the substance, the apparatus comprising:
a cantilever palette including a plurality of cantilever array blocks, each cantilever array block including a plurality of cantilevers, each cantilever including a plurality of cantilever fingers surrounded by a frame with frame fingers, the cantilever fingers and the frame fingers forming a diffraction grating, wherein each cantilever finger in the array block comprises the sensing material selected to interact with the substance predetermined for measurement by the apparatus, such that cantilevers of the cantilever array block deflect in the presence of the substance, causing the diffraction grating to diffract light and thereby provide a change in a diffraction pattern or color of the diffracted light, as a visual indication of the presence of the substance, and wherein the apparatus does not include an external source of electrical power for the cantilever palette.

2. The apparatus of claim 1 wherein the substance is a chemical.

3. The apparatus of claim 1 wherein the substance is an antibody or an antigen.

4. The apparatus of claim 1 wherein each cantilever array block of the plurality of cantilever array blocks comprises one of a plurality of different sensing materials, respectively, and each sensing material interacts with a different predetermined substance.

5. The apparatus of claim 1 wherein each cantilever array block of the plurality of cantilever array blocks comprises sensing material that interacts with a predetermined level of a single predetermined substance.

6. The apparatus of claim 1 wherein the plurality of cantilever array blocks includes cantilever array block subsets, each cantilever array block subset comprises sensing material that interacts with a different predetermined substance, respectively, and each cantilever array block within each cantilever array block subset comprises sensing material that interacts with a predetermined level of the predetermined substance.

7. The apparatus of claim 1 further comprising image enhancement devices selected from the group consisting of: a beam splitter, a visible lens, and a spatial filter.

8. The apparatus of claim 1 further comprising a pin hole array attached to the cantilever palette.

9. A method of identifying the presence of a chemical substance in a liquid test environment, the method comprising the steps of:
forming a cantilever palette including a plurality of cantilever array blocks, each cantilever array block including a plurality of cantilevers, each cantilever including a plurality of cantilever fingers surrounded by a frame with frame fingers, the cantilever fingers and the frame fingers forming a diffraction grating, wherein the cantilever fingers comprise a sensing material selected to preferentially bind and thereby identify the presence of the substance, wherein the cantilever palette does not include an external electrical power source;
exposing the cantilever palette to the test liquid comprising the a substance, thereby causing cantilevers of the cantilever array block to deflect such that the diffraction grating produces diffracted light; and
visually observing the diffracted light from the diffraction grating to identify the presence of the substance.

10. The method of claim 9 further comprising prior to the forming step, configuring each cantilever array block of the plurality of cantilever array blocks to be responsive to a different predetermined substance.

11. The method of claim 9 further comprising prior to the forming step, configuring each cantilever array block of the plurality of cantilever array blocks to be responsive to a predetermined level of a single predetermined substance.

12. The method of claim 9 further comprising prior to the forming step, selecting different substances and levels of each of a plurality of substances to be identified; forming cantilever array block subsets; and configuring each cantilever array block subset to be responsive to a different predetermined substance, and configuring each cantilever array block within each cantilever array block subset to be responsive to a predetermined level of the predetermined substance.

13. The apparatus of claim 1, wherein the cantilever fingers of the cantilever palette interact with the substance in the liquid, and deflect from an initial position with respect to the frame fingers of the cantilever palette, to alter the diffraction grating.

14. The apparatus of claim 13, wherein the sensing material comprises a monoclonal antibody and the predetermined substance comprises an antigen, wherein the monoclonal antibody binds to the antigen and the cantilever fingers deflect in the presence of the antigen.

15. The method of claim 9, wherein observing the diffracted light in the test environment further comprises comparing diffraction of incident light prior to and after exposing the cantilever palette to the test environment.

16. The method of claim 15, wherein:
exposing the cantilever palette to the test environment further includes exposing the cantilever palette to incident white light; and
visually observing the diffracted light for a change in color, pattern, or intensity to determine if the predetermined substance is preferentially bound to the cantilevers to identify the physical property which is at least one of the presence of the predetermined substance and the level of the predetermined substance.

17. The method of claim 16, wherein the cantilever fingers comprise a sensing material which is a biomolecule that preferentially binds to the predetermined substance.

18. The method of claim 17, wherein the biomolecule comprises a monoclonal antibody, and the predetermined substance comprises an antigen that binds to the monoclonal antibody, wherein the cantilever fingers deflect in response to binding of the antigen.

19. The method of claim 9, wherein observing the diffracted light in the test environment further comprises comparing diffraction of incident light after exposing the cantilever palette to the test environment 1 and to an environment in the absence of the substance or in the presence of a predetermined amount of the substance.

20. An apparatus to detect a substance in an environment, comprising:
a cantilever array block, the cantilever array block including a plurality of cantilevers comprising a plurality of cantilever fingers surrounded by a frame with a plurality of frame fingers, the cantilever fingers and frame fingers forming a diffraction grating, the cantilever fingers comprising a substrate material and a sensing material which is predetermined to respond to the substance, wherein the cantilevers fingers deflect in a presence of the substance, causing the diffraction grating to diffract light and thereby provide visual indicia of the physical property, and the cantilever array block does not include an external electrical power source.

21. The apparatus of claim 20, wherein the visual indicia of the diffraction grating are selected from a group of changes in diffraction consisting of changes in color, changes in intensity, and changes in pattern of the diffracted light.

22. An apparatus to measure a chemical-mechanical micro-force, comprising:
a cantilever palette including at least one cantilever array block, the at least one cantilever array block including a plurality of cantilevers with cantilever fingers, the cantilever fingers surrounded by a frame with frame fingers, the cantilever fingers and the frame fingers forming a diffraction grating, wherein the cantilever fingers comprise a material selected as a binding reagent, such that in a presence of a ligand of the binding reagent, the cantilever fingers deflect, causing the diffraction grating to diffract light and thereby provide visual indications of the presence of the ligand, wherein the apparatus does not include an external electrical power source.

23. A sensor for detecting a chemical substance, the sensor comprising:
a first cantilever array including a plurality of first cantilever fingers, each first cantilever finger including a sensing material, such that the sensing material in a presence of the substance binds to the first cantilever in a presence of the substance;
a second cantilever array including a plurality of second cantilever fingers, the first and second cantilever arrays being disposed with respect to each other such that the first cantilever fingers are surrounded by the second cantilever fingers; wherein
the first and second cantilever fingers form a diffraction grating having an effect on light from a light source, wherein the effect of the diffraction grating on the light varies as the first cantilevers bend, such that the variation of the effect corresponds to a variation in the presence of the substance, wherein the apparatus does not include an external electrical power source.

24. The sensor of claim 23, wherein the sensing material is mounted on a surface of each of the first cantilever fingers and binds the substance to the surface so as to cause each of the first cantilever fingers to bend.

25. The sensor of claim 23, wherein the light source is incident light.

26. An apparatus to measure interactions between a predetermined substance and a sensing material that binds the substance, the apparatus comprising:
a cantilever palette including a plurality of cantilever array blocks, each cantilever array block including a plurality of cantilevers, each cantilever including a plurality of cantilever fingers surrounded by a frame with frame fingers, the cantilever fingers and the frame fingers forming a diffraction grating, wherein each cantilever array block comprises the sensing material selected to interact with the substance predetermined for measurement by the apparatus, such that cantilevers of the cantilever array block deflect in the presence of the substance, causing the diffraction grating to diffract light and thereby provide a change in a diffraction pattern or color of the diffracted light, as a visual indication of the presence of the substance, and wherein the apparatus does not include an external electrical power source, and wherein the sensing material comprises a monoclonal antibody and the substance comprises an antigen, wherein the monoclonal antibody binds to the antigen and the cantilever fingers deflect in the presence of the antigen.

* * * * *

UNITED STATES PATENT AND TRADEMARK OFFICE
CERTIFICATE OF CORRECTION

PATENT NO.       : 7,105,358 B2                                          Page 1 of 1
APPLICATION NO.  : 10/076838
DATED            : September 12, 2006
INVENTOR(S)      : Arunaya Majumdar et al.

It is certified that error appears in the above-identified patent and that said Letters Patent is hereby corrected as shown below:

IN THE CLAIMS:

Claim 9, at line 17, "the a substance" should say --the substance--.

Claim 19, at line 4, "to the test environment 1 and to an environment" should say --to the test environment, and to an environment--.

Signed and Sealed this

Thirteenth Day of March, 2007

JON W. DUDAS
*Director of the United States Patent and Trademark Office*